United States Patent
Fina et al.

(10) Patent No.: US 10,380,475 B2
(45) Date of Patent: Aug. 13, 2019

(54) RFID INTEGRATED CIRCUIT

(71) Applicant: NXP B.V., Eindhoven (NL)

(72) Inventors: Thomas Fina, Graz (AT); Roland Brandl, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/952,161

(22) Filed: Apr. 12, 2018

(65) Prior Publication Data
US 2018/0300594 A1 Oct. 18, 2018

(30) Foreign Application Priority Data

Apr. 14, 2017 (EP) ..................................... 17166709

(51) Int. Cl.
*G06K 19/07* (2006.01)
*G06K 19/073* (2006.01)

(52) U.S. Cl.
CPC ........... *G06K 19/073* (2013.01); *G06K 19/07* (2013.01); *G06K 19/0723* (2013.01)

(58) Field of Classification Search
CPC ... G06K 19/073; G06K 19/07; G06K 19/0723
USPC ............................................... 340/13.2–13.27
See application file for complete search history.

(56) References Cited

U.S. PATENT DOCUMENTS

| | | | | |
|---|---|---|---|---|
| 4,829,169 A * | 5/1989 | Watanabe | ............ | G06Q 20/341 235/380 |
| 5,963,142 A * | 10/1999 | Zinsky | ................ | G06F 12/1433 340/5.74 |
| 7,702,984 B1 * | 4/2010 | Lee | ..................... | G06F 12/1416 365/185.33 |
| 7,974,537 B2 * | 7/2011 | Li | .......................... | H04B 10/40 398/135 |
| 2006/0215592 A1 * | 9/2006 | Tomoe | .................... | H04L 45/00 370/315 |
| 2007/0045424 A1 * | 3/2007 | Wang | .................. | H04W 40/246 235/462.46 |
| 2008/0086631 A1 * | 4/2008 | Chow | ..................... | G06F 8/654 713/2 |

(Continued)

FOREIGN PATENT DOCUMENTS

JP 2008-250426 A 10/2008
WO 2008/002965 A2 1/2008

(Continued)

OTHER PUBLICATIONS

Extended European Search Report for Patent Appl. No. 17166709.0 (dated Nov. 8, 2017).

*Primary Examiner* — Allen T Cao

(57) ABSTRACT

The disclosure relates to an integrated circuit for a radio-frequency identification (RFID) tag. Example embodiments include an integrated circuit (101) for an RFID tag, the integrated circuit (101) comprising: a memory (104) for storing data; a transceiver (107) for receiving signals from, and transmitting signals to, an antenna (102); and a controller (103) configured to process signals received via the transceiver (107) and to access data stored in the memory (104); wherein upon receiving, via the transceiver module (107), a lock command referring to a data block in the memory (104), the controller (103) is configured to generate error correction data for the data block and to store the error correction data in the memory.

10 Claims, 4 Drawing Sheets

(56) References Cited

U.S. PATENT DOCUMENTS

| | | | |
|---|---|---|---|
| 2008/0177922 A1* | 7/2008 | Chow | G06F 11/2221 710/302 |
| 2014/0136928 A1 | 5/2014 | Mu et al. | |
| 2015/0310723 A1* | 10/2015 | Pinkerton | G08B 21/182 340/870.09 |
| 2017/0234818 A1* | 8/2017 | Jesme | A61B 5/443 374/54 |
| 2017/0248475 A1* | 8/2017 | Bonifas | G01N 25/18 |
| 2017/0249542 A1* | 8/2017 | Gabriel | G06K 19/0707 |
| 2017/0337461 A1* | 11/2017 | Jesme | G01J 5/02 |
| 2018/0165561 A1* | 6/2018 | Gabriel | G06K 7/10356 |

FOREIGN PATENT DOCUMENTS

| | | |
|---|---|---|
| WO | 2008/076898 A1 | 6/2008 |
| WO | 2009/120231 A1 | 10/2009 |

\* cited by examiner

RFID INTEGRATED CIRCUIT

CROSS-REFERENCE TO RELATED APPLICATIONS

This application claims the priority under 35 U.S.C. § 119 of European patent application no. 17166709.0, filed on Apr. 14, 2017, the contents of which are incorporated by reference herein.

FIELD

The disclosure relates to an integrated circuit for a radio-frequency identification (RFID) tag.

BACKGROUND

RFID tags are used to store information which can be wirelessly accessed with an RFID reader. For example electronic product codes (EPCs), keys, or passwords may be stored on an RFID tag. Such information may be written into the memory of an RFID tag during an initialisation process, either at assembly of the tag, or when the tag is to be used.

The initialisation process may be performed using an RFID reader (or RFID interrogator). The reader requests the tag to store a block of data, such as an EPC, on a memory in the RFID tag. The request may specify a location in the memory at which to store the data block. The tag receives this request and stores the requested data block at the requested memory location. This process may be repeated on multiple RFID tags.

Errors can develop in the stored data. Error correction techniques allow recovery of the original data when errors develop. Error correction codes (ECC) add redundant data (known as error correction data or parity) to the data block. The redundant data can be used to check data in the data block and restore original data if errors develop.

SUMMARY

According to a first aspect of the disclosure there is provided an integrated circuit for an RFID tag, the integrated circuit comprising: a memory for storing data; a transceiver for receiving signals from, and transmitting signals to, an antenna; and a controller configured to process signals received via the transceiver and to access data stored in the memory, wherein upon receiving, via the transceiver module, a lock command referring to a data block in the memory, the controller is configured to generate error correction data for the data block and to store the error correction data in the memory.

The lock command may be sent to the tag by an RFID interrogator. For example, the interrogator may instruct the tag to store data, e.g. an EPC, and issue the lock command to lock the data within the memory of the tag. Although a tag may be capable of error correction, the interrogator may lack the functionality required to generate error correction data or to instruct the tag to generate error correction data. In the RFID tag of the present disclosure, the tag automatically generates error correction data upon receipt of a lock command. The interrogator thus does not need to send any error correction generation commands. Each time the data in the data block is changed, a new lock command may be issued, triggering an automatic re-generation of the error correction data associated with that data block.

The error correction data may be generated using an error correction code, such as a Hamming code or BCH code.

In some embodiments the controller may be configured to operate in an error correction mode associated with a data block in the memory, wherein in the error correction mode the controller is configured to: perform an error check on the data block by comparing the data block to error correction data associated with the data block; and if the error check determines that the data block comprises an error, correct the data block using the error correction data. For example, the controller may perform an error check on the data block each time the data block is accessed, as long as the error correction mode for that data block is activated.

Generating the error correction data may be referred to as an "encoding step". Checking the data may be referred to as a "decoding step", and correcting the data may be referred to as an "error correction step".

In some embodiments, the error correction mode for the data block is de-activated after the controller receives, via the transceiver, a lock command referring to that data block. If there is any error correction data already associated with that data block, the controller may be further configured to delete or over-write that previous error correction data when the error correction mode for the data block is de-activated. For example, previous error correction data may be over-written with newly generated error correction data.

In some embodiments the error correction mode for the data block may be activated (or re-activated) after the controller generates the error correction data for that data block.

In some embodiments, the error correction mode for the data block may be deactivated after the controller receives, via the transceiver, an unlock command referring to that data block, or any command to change the data in the data block, for example a write command.

In some embodiments, the controller may be further configured to lock the data block in the memory, and the controller may be configured to generate the error correction data for the data block after locking the data block. The controller may be configured to generate the error correction data immediately after locking the data block, or after the next power-up cycle following the lock command.

In some embodiments the lock command may be a permanent lock command, such that the error correction data is generated (or re-generated) only if a permanent lock command is received. If a temporary lock command is received, the error correction data may not be generated.

In some embodiments the controller may be configured to transmit, via the transceiver, a signal indicating that the data block has been successfully locked.

According to a second aspect of the disclosure there is provided an RFID tag comprising: an antenna for transmitting and receiving signals to and from an RFID interrogator; and an integrated circuit according to any of embodiment of the first aspect.

According to a third aspect of the disclosure there is provided a method of correcting errors in a memory of an RFID tag, the method comprising: receiving, at an antenna of the RFID tag, a lock command referring to a data block; in response to receiving the lock command, generating error correction data for the data block and storing the error correction data in the memory;

performing an error check on the data block by comparing the data block to the error correction data; and if the error check determines that the data block comprises an error, correct the data block using the error correction data.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
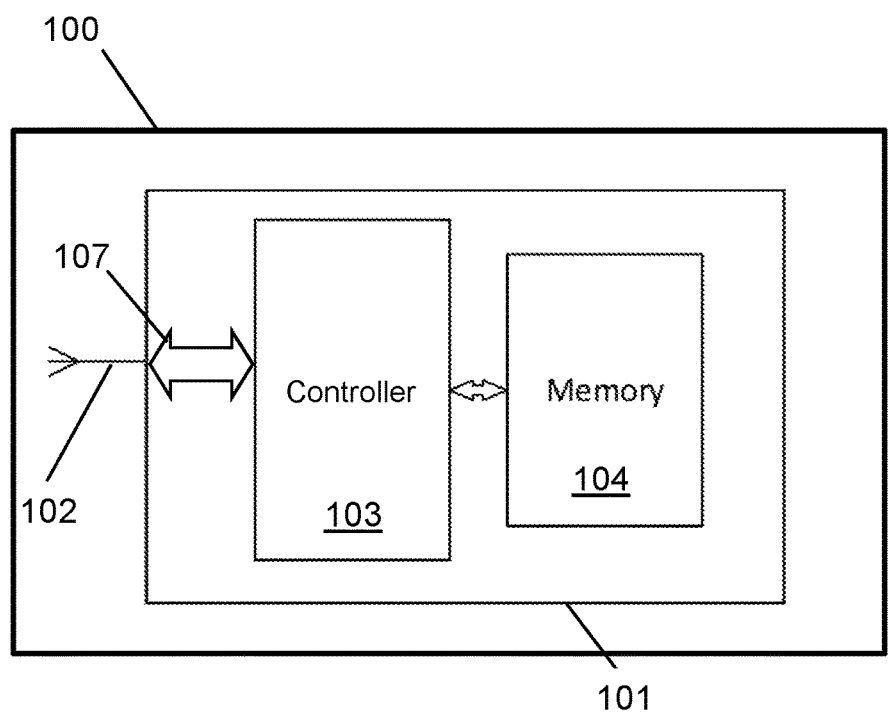
FIG. 1 is a schematic diagram illustrating an example embodiment of an RFID tag.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows an RFID tag 100 comprising an integrated circuit (IC) 101 according to the present disclosure. The tag 100 further comprises an antenna 102 for transmitting and receiving communications, for example to and from an RFID interrogator (or RFID reader).

The IC 101 comprises a controller 103, a memory 104 and a transceiver 107. The controller 103 is configured to receive and process signals from the antenna 101 via the transceiver 107, and to access the memory 104. Data, such as an electronic product code (EPC), may be stored in the memory 104. The data may be stored on one or more data blocks of memory 104. A data block may for example be an individual bit, a plurality of bits, a word, a memory bank, or data block inside a memory bank. The memory 104 may be a non-volatile memory.

Data is stored in the memory 104 during an initialisation process. An RFID interrogator transmits a write command to the RFID tag 100. The write command comprises data to be stored in the memory 104. The antenna 102 of the tag 100 receives the write command, and the command is interpreted by the controller 103. The controller 103 accesses the memory 104, and instructs the memory 104 to store the data received with the write command.

After data has been stored in the memory 104, the data block or blocks storing the data may be locked, so that the data cannot be overwritten. The RFID interrogator may transmit a lock command to the tag 100, which is processed by the controller 103.

The stored data may need to be subsequently updated or altered. Before making the changes, it may be necessary to issue an unlock command to the tag, reversing the lock command. The data may be altered or re-written using write commands. Once updated, the data block may again be locked by issuing a lock command.

Even if the data has been stored correctly, errors may develop overtime. RFID tags use error correction techniques to correct errors that appear, to attempt to maintain the data in its originally intended form. Error correction codes (ECC) generate error correction data which can be used to check and correct data blocks in the memory. One drawback to using error correction is that every time the data is initialised or changed, the error correction data must be updated. In conventional systems this is achieved by using additional protocol steps, in which an RFID interrogator instructs the tag to generate error correction data.

In the present disclosure, the error correction data is automatically generated or updated by the controller of the tag upon receipt of a lock command, without the need for any additional interaction with the interrogator.

Figure 2:
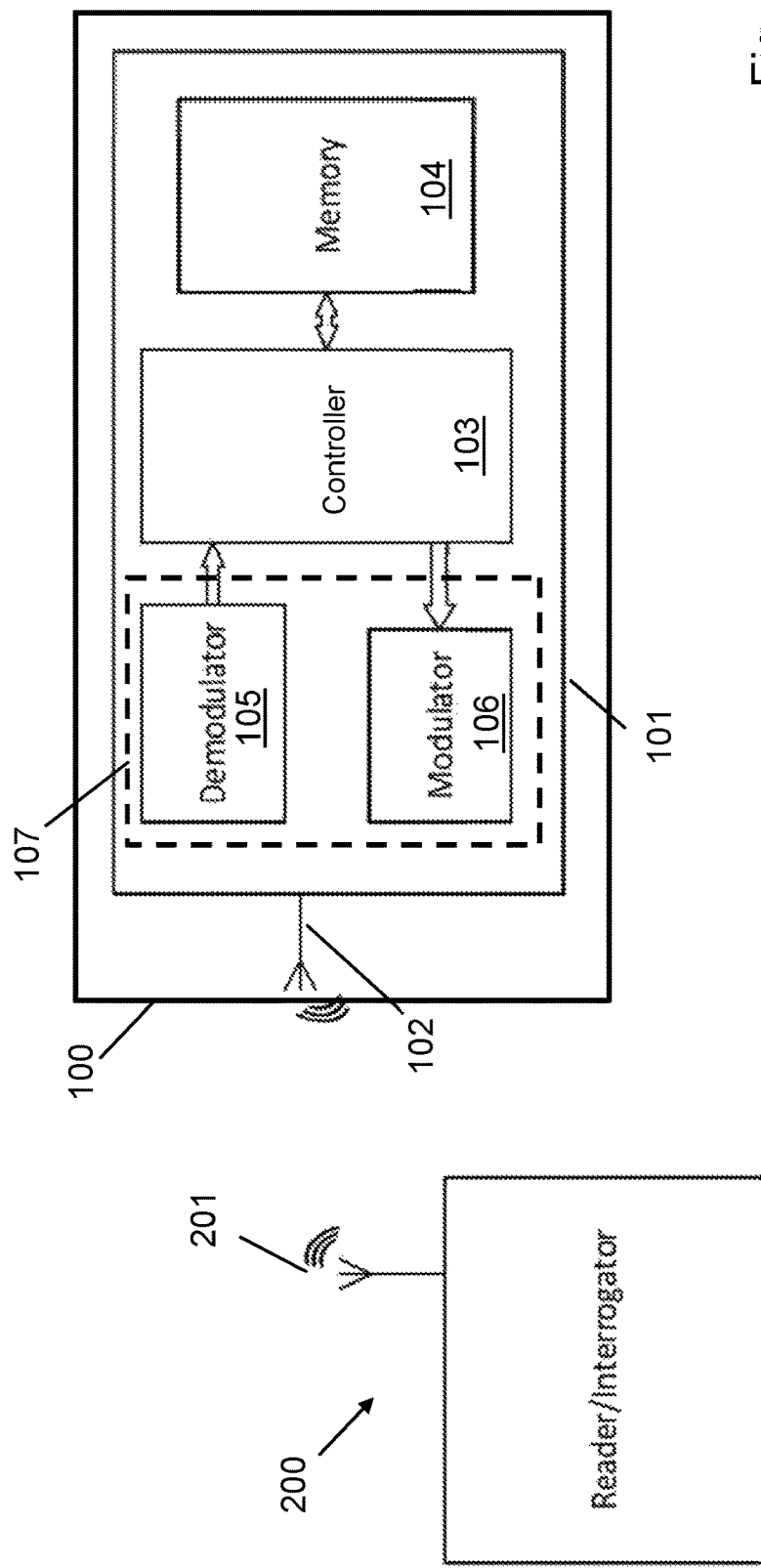
FIG. 2 is a schematic diagram illustrating communication between an RFID tag and an RFID interrogator.
Figure 3:
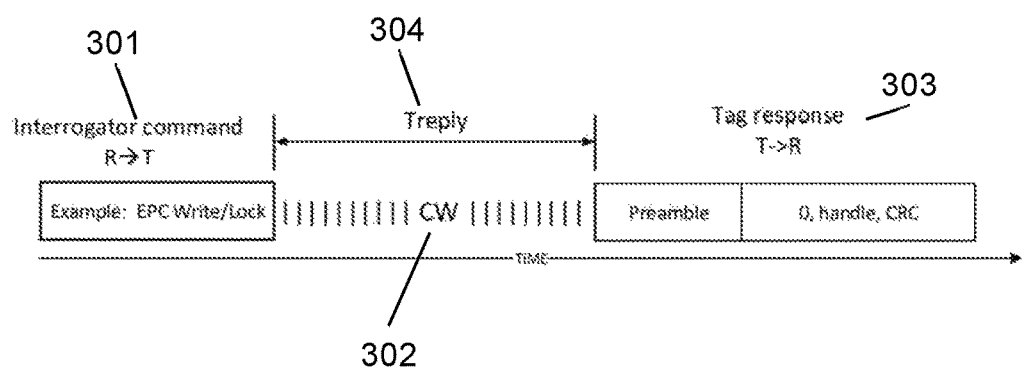
FIG. 3 is a schematic diagram illustrating an example sequence of communications between an RFID tag and interrogator.

The process of transmitting commands to the RFID tag 100 is shown in more detail in FIGS. 2 and 3.

FIG. 2 shows an RFID reader/interrogator 200 communicating with an RFID tag 100. Interrogator 200 comprises an antenna 201 which can transmit signals to the tag 100, and receive signals from the tag 100. The signals may be in the low-frequency (LF), high-frequency (HF) (typically 13.56 MHz) or ultrahigh-frequency (UHF) (e.g. 960 MHz) radio domains. The interrogator 200 transmits information by modulating a continuous waveform field (CW) over its antenna 201.

Signals transmitted from the interrogator 200 may be received by the tag antenna 102, and from there passed to the controller 103 via the transceiver 107, comprising a demodulator 105 for incoming signals from the antenna 102 and a modulator 106 for outgoing signals to the antenna 102. The demodulator 105 may provide an envelope signal or the decoded bit data or byte data or as an interpreted command to the controller 103.

The controller 103 may verify received signals, for example checking passwords and checksums of the interrogator command. Depending upon the instructions in the signal, the controller 103 may then access the memory 104, for example to read from or write to the memory 104. At the end of this process the controller 103 may generate a response to the interrogator 200 that is transmitted via the tag antenna 102. The modulator 106 may for example modulate a reflection coefficient of the tag antenna 102 to transmit the signal.

The interrogator 200 and tag 100 may communicate in a number of ways. One example embodiment may be the full duplex mode or half duplex mode. A half duplex communication mode is illustrated in FIG. 3, illustrating a successful command and reply sequence between a reader/interrogator and a tag. In this example process, the interrogator 200 always "talks first" by sending a command 301 to the tag 100 (or a plurality of tags within range of the reader) and then provide a continuous waveform (CW) field 302. The tag 100 may listen to the request, process it and provide a response 303 to the interrogator 200 after a certain reply time 304.

There are some industry standards for this communication between interrogator and tag(s), such as ISO 14443, ISO 15693 or EPCglobal Gen2. All these standards define commands to read data from, and store or lock data to, the memory 104. The standard commands described below correspond to the commands defined under the EPCglobal Gen2, but the disclosure is not limited to this particular standard.

An example of a standard read command is shown in Table 1 below. The read command requests data of a certain length, indicated by WordCount, from a certain location, indicated by WordPtr, within the memory 104. The controller 103 of the tag 100 reads the memory 104 and transmits a response comprising the requested data back to the interrogator 200. An example response is shown in Table 2 below.

TABLE 1

Example read command.

| | Command | MemBank | WordPtr | WordCount | RN | CRC |
|---|---|---|---|---|---|---|
| # of bits: | 8 | 2 | EBV | 8 | 16 | 16 |
| description: | 11000010 | 00: Reserved<br>01: EPC<br>10: TID<br>11: User | Starting address pointer | Number of words to read | handle | CRC-16 |

TABLE 2

Example tag response.

| | Header | Memory Words | RN | CRC |
|---|---|---|---|---|
| # of bits: | 1 | Variable | 16 | 16 |
| description: | 0 | Data | handle | CRC-16 |

A standard write command is shown in Table 3 below. The write command requests that a certain amount of data, which may be sent with the command, is stored at a particular location, identified by WordPtr, within the memory 104. The controller 103 programs the requested data to the requested memory location. The data to be stored may be, for example, an EPC, a password, a key, or parts thereof.

TABLE 3

Example standard write command.

| | Command | MemBank | WordPtr | Data | RN | CRC |
|---|---|---|---|---|---|---|
| # of bits: | 8 | 2 | EBV | 16 | 16 | 16 |
| description: | 11000011 | 00: Reserved<br>01: EPC<br>10: TID<br>11: User | Address pointer | RN16 ⊗ word to be written | handle | CRC-16 |

A standard lock command is shown in Table 4 below. The lock command requests in its payload, shown in more detail in Table 5 below, that certain data blocks or memory banks within the memory 104 are locked from write and/or read access. The lock command may be a normal lock, so that a RFID interrogator with the correct permission, e.g. a correct password, may unlock or overwrite the data. The lock may alternatively be a permanent lock, which cannot be unlocked by any interrogator.

TABLE 4

Example standard lock command.

| | Command | Payload | RN | CRC |
|---|---|---|---|---|
| # of bits: | 8 | 20 | 16 | 16 |
| description: | 11000101 | Mask and Action Fields | handle | CRC-16 |

TABLE 5

Example lock-command payload.

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| Kill Mask | | Access Mask | | EPC Mask | | TID Mask | | File_0 Mask | | Kill Action | | Access Action | | EPC Action | | TID Action | | File_0 Action | |

Typically the initialisation process for a tag 100 comprises sending from an RFID interrogator a write command to the tag 100, the write command comprising data, e.g. an EPC, to be stored in the memory 104, and sending a lock command to lock those parts of the memory 104 in which the information has been stored.

When the lock command is received, the controller 103 automatically generates error correction data for the data block using an error correction code such as Hamming code or BCH code. The error correction data is stored in memory 104, and is associated with the data block from which it is generated. The error correction data may be generated after the controller 103 locks the data block, and the controller 103 may subsequently transmit, via the transceiver 107, a signal indicating that the data block has been successfully locked.

After generation of the error correction data, the controller 103 activates an error correction mode for the data block. In the error correction mode, the controller 103 uses the error correction data to check the data in the data block for errors. For example, the same code as was used to generate the error correction data may be used on the data block, and the result compared to the error correction data. If the result and the error correction data do not correspond, the controller 103 determines that there is an error in the data block. If an error is found, the controller 103 determines a correction using the error correction data, and corrects the data in the data block. The process of checking and correcting the data block may for example be performed each time the data block is accessed, e.g. read, as long as the error correction mode for that data block is activated.

If the data in the data block is to be changed, the error correction mode for that data block may be deactivated, so that error correction does not occur whilst the data is being changed. For example, the error correction mode may be deactivated if the controller receives a command to unlock or over-write the data in the data block. After the data is changed, a new lock command may be issued. In response to receiving the lock command, the error correction data is automatically regenerated by the controller 103 so that errors in the newly stored data may be corrected.

The error correction mode may also be deactivated when a lock command is received, as the first step in generating error correction data. For example, upon receipt of a lock command for a particular data block, the controller may deactivate the error correction mode for that data block, generate new error correction data, store the new error correction data in the memory, and re-activate the error correction mode based on the new error correction data.

A lock command may be a permanent lock command, or a temporary lock command. A temporary lock command may allow data to be subsequently changed, for example if an unlock command is received. A permanent lock command may be irreversible. The controller 103 may be configured to only generate new error correction data if a permanent lock command is received for the data block.

A lock command may relate to a single data block in the memory 104, a plurality of data blocks, or all data blocks. Upon receipt of a lock command, the controller 103 may be configured to generate error correction data for all data blocks referred to in the lock command, or only a subset of data blocks, or parts of data blocks.

Figure 4:
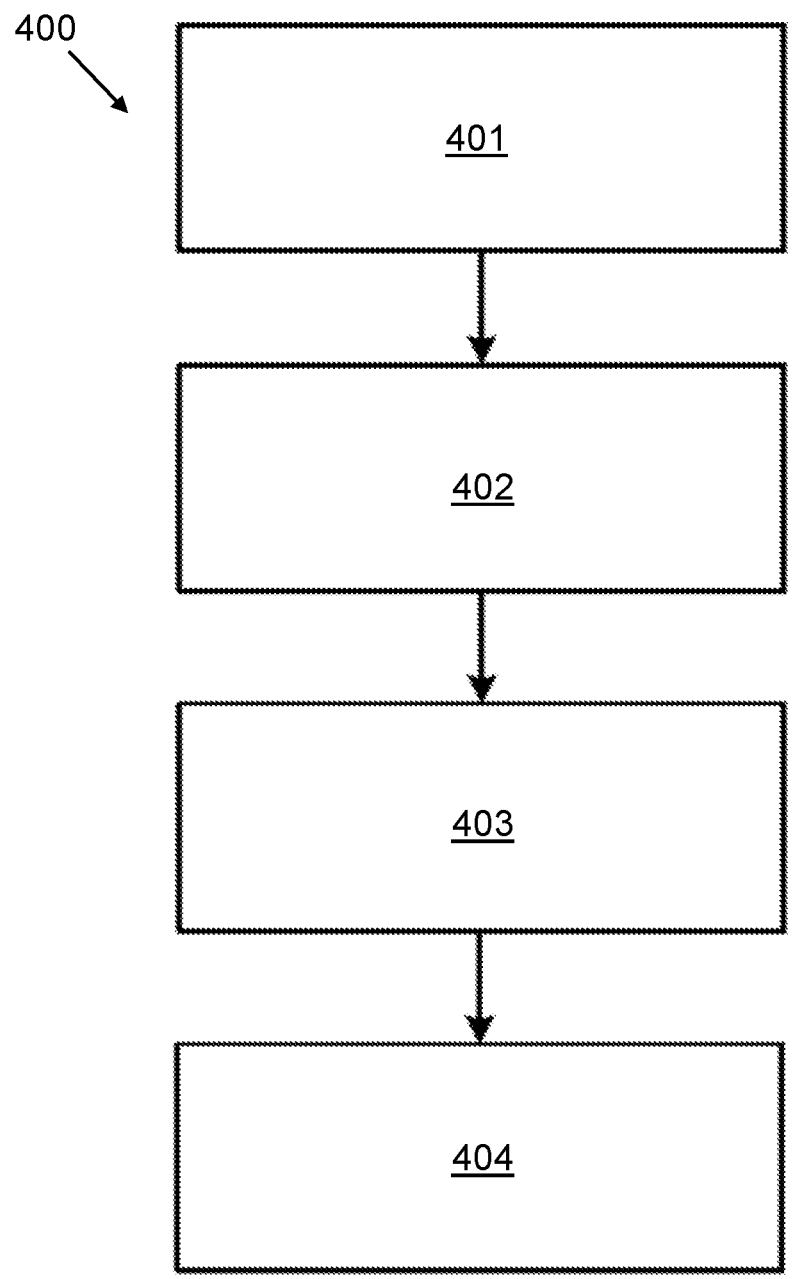
FIG. 4 is a schematic flow chart illustrating an example method of correcting errors in the memory of an RFID tag.

FIG. 4 illustrates a method 400 of correcting errors in a memory of an RFID tag, such as RFID tag 100.

At step 401, a lock command referring to a data block in the memory is received at an antenna of the RFID tag.

At step 402, in response to receiving the lock command, error correction data for the data block are generated and stored in the memory.

At step 403, an error check is performed on the data block by comparing the data block to the error correction data.

At step 404, if the error check determines that the data block comprises an error, the data block is corrected using the error correction data.

The error correction data may be regenerated each time the data block is changed, upon receipt of a further lock command.

From reading the present disclosure, other variations and modifications will be apparent to the skilled person. Such variations and modifications may involve equivalent and other features which are already known in the art of RFID tags and integrated circuits for RFID tags and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An integrated circuit for an RFID tag, the integrated circuit comprising:
    a memory for storing data;
    a transceiver for receiving signals from, and transmitting signals to, an antenna; and
    a controller configured to process signals received via the transceiver and to access data stored in the memory,
    wherein upon receiving, via the transceiver module, a lock command referring to a data block in the memory, the controller is configured to generate error correction data for the data block and to store the error correction data in the memory, and
    wherein the controller is configured to operate in an error correction mode associated with the data block in the memory, wherein when the error correction mode is activated the controller is configured to:
    perform an error check on the data block by comparing the data block to error correction data associated with the data block; and
    if the error check determines that the data block comprises an error, correct the data block using the error correction data.

2. The integrated circuit of claim 1, wherein the error correction mode for the data block is deactivated after the controller receives, via the transceiver, a lock command referring to that data block.

3. The integrated circuit of claim 2, wherein the controller is further configured to delete or over-write previous error correction data associated with the data block when the error correction mode for the data block is de-activated.

4. The integrated circuit of claim 1, wherein the error correction mode for the data block is activated after the controller generates the error correction data for that data block.

5. The integrated circuit of claim 1, wherein the error correction mode for the data block is deactivated after the controller receives, via the transceiver, an unlock command referring to that data block.

6. The integrated circuit of claim 1, wherein the controller is further configured to lock the data field in the memory, and wherein the controller is configured to generate the error correction data for the data field after locking the data field.

7. The integrated circuit of claim 1, wherein the lock command is a permanent lock command.

8. The integrated circuit of claim 1, wherein the controller is configured to transmit, via the transceiver, a signal indicating that the data field has been successfully locked.

9. An RFID tag comprising:
    an antenna for transmitting and receiving signals to and from an RFID interrogator; and
    an integrated circuit according to claim 1.

10. A method of correcting errors in a memory of an RFID tag, the method comprising:
    receiving, at an antenna of the RFID tag, a lock command referring to a data block stored in the memory of the RFID tag;

in response to receiving the lock command, generating error correction data for the data block and storing the error correction data in the memory; and during an error correction mode associated with the data block in the memory:

performing an error check on the data block by comparing the data block to the error correction data associated with the data block, and if the error check determines that the data block comprises an error, correcting the data block using the error correction data.

* * * * *